A. L. FLATTUM.
HARROW.
APPLICATION FILED MAR. 13, 1911. RENEWED NOV. 2, 1911.

1,015,548.

Patented Jan. 23, 1912.
2 SHEETS—SHEET 1.

Witnesses

Inventor
Albert L. Flattum.
By
Attorneys

A. L. FLATTUM.
HARROW.
APPLICATION FILED MAR. 13, 1911. RENEWED NOV. 2, 1911.
1,015,548.
Patented Jan. 23, 1912.
2 SHEETS—SHEET 2.
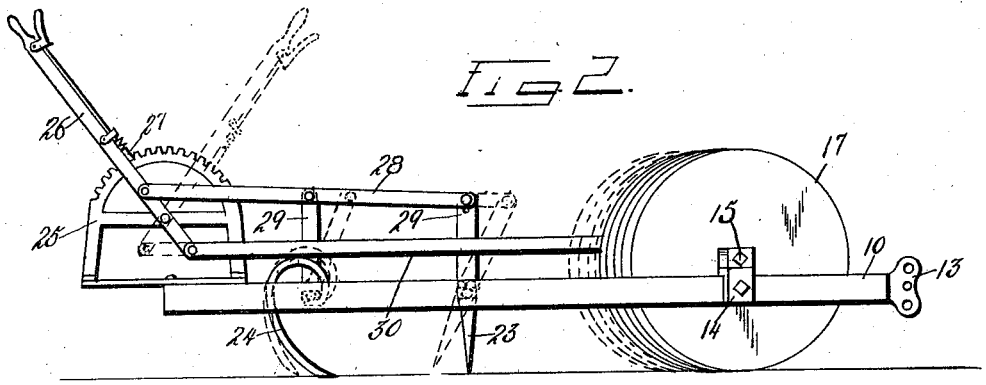
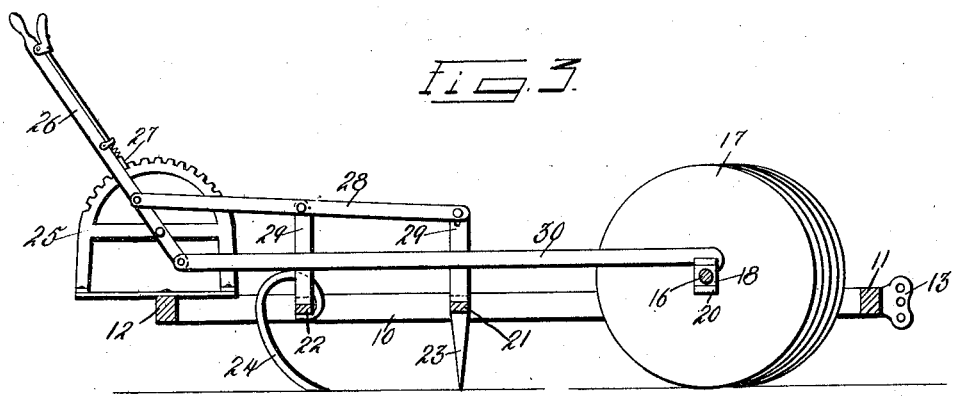
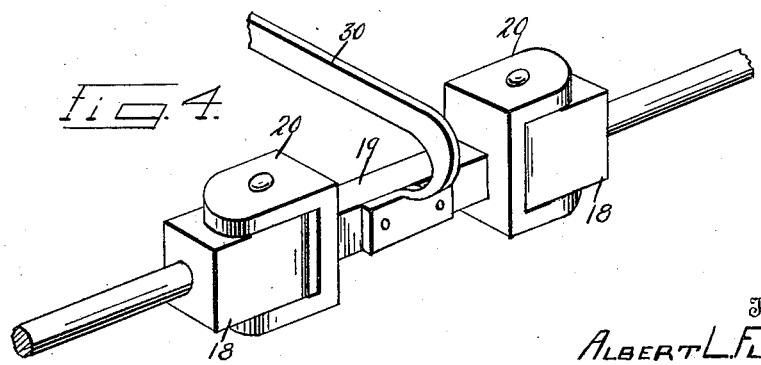
Inventor
Albert L. Flattum.
Witnesses

UNITED STATES PATENT OFFICE.

ALBERT LEO FLATTUM, OF BUTLER, SOUTH DAKOTA.

HARROW.

1,015,548.  Specification of Letters Patent.  Patented Jan. 23, 1912.

Application filed March 13, 1911, Serial No. 614,086. Renewed November 2, 1911. Serial No. 658,231.

*To all whom it may concern:*

Be it known that I, ALBERT L. FLATTUM, a citizen of the United States, residing at Butler, in the county of Day, State of South Dakota, have invented certain new and useful Improvements in Harrows; and I do hereby declare the following to be a full, clear, and exact description of the invention, such as will enable others skilled in the art to which it appertains to make and use the same.

This invention relates to harrows, and has special reference to a novel form of harrow wherein the frame supports both disk and tooth elements for working the earth.

One object of the invention is to provide a harrow wherein the disks can be inclined with reference to the sides of the harrow and at the same time the teeth set at different angles to the ground.

With the above and other objects in view, the invention consists in general of such novel details of construction and combination of parts hereinafter fully described, illustrated in the accompanying drawings, and specifically set forth in the claims.

Figure 1:
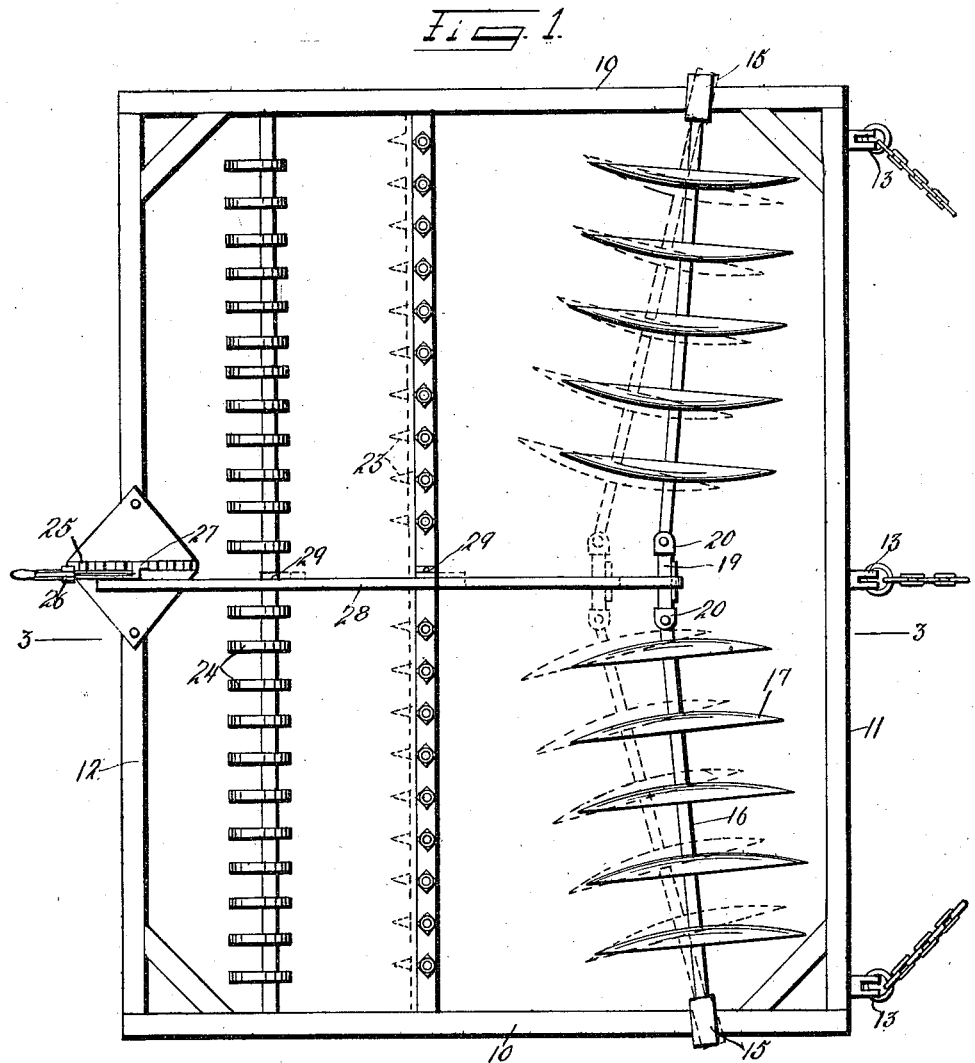
Figure 5:
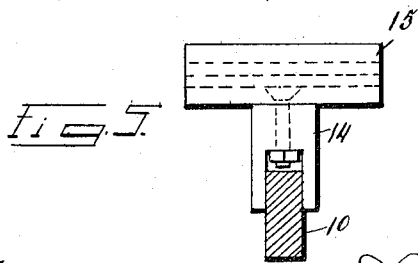

In the accompanying drawings, like characters of reference indicate like characters in the several views, and Figure 1 is a plan view of a harrow constructed in accordance with this invention. Fig. 2 is a side elevation of such a harrow. Fig. 3 is a section on the line 3—3 of Fig. 1. Fig. 4 is a detail view of the connection between certain bars which support the disk. Fig. 5 is a view of the swiveling device used to support the disk bars on the harrow frame.

The frame of this harrow comprises side members 10 arranged to extend longitudinally of the harrow, a front member 11, and rear members 12. To the front member 11 is attached suitable draft means as indicated at 13. These draft means provide for a connection between the harrow and a plow so that the latter may be attached to the ordinary plow and pulled behind it, thus completely harrowing the ground while the plowing operation is being performed.

Against the forward end of each of the members 10 there is provided a bracket 14 whereon is swivelly mounted a guide 15. Through each of the guides 15 extends a bar 16 whereon are mounted colter disks 17 of the ordinary type. These bars 16 are slidable in the members 15 but are prevented from rotation therein by reason of the ends of the bars being square in cross section and opening through the respective member 15 being likewise square in cross section. The inner ends of these bars 16 are also squared as 18.

At 19 is a link provided with forked ends 20 which are pivotally connected to and embrace the ends 18 of the bars 16.

At 21 and 22 are shown respectively forward and rearward transverse tooth bars and from the bar 21 depend teeth 23 of the ordinary spike form, while from the bar 22 depend spring teeth 24. These bars 21 and 22 are journaled in suitable bearings on the member 10.

Upon the rear of the frame is mounted a quadrant 25, pivotally attached to which is a lever 26 provided with a latch 27, the lever thus being a latch lever. To the latch lever 26 is connected a link 28 which is in turn connected to rock arms 29 extending upward from the tooth bars 21 and 22. This lever 26 also has connected to it a link 30 which is connected to the link 19. These two links 28 and 30 thus form link rods.

From an inspection of the drawings, and more especially of Fig. 3, it will be observed that when the handle of the lever 26 is pushed forward, the link 19 is drawn backward by the action of the link rod 30, while at the same time the teeth 23 and 24 are slanted backward. By this means the disks 17 are caused to assume an angle to the direction of draft, the angle varying with the extent to which the latch lever 26 is shoved forward. If the latch lever be drawn backward, the shaft or bars 16 will be placed in alinement and the teeth 23 will be directly up and down, or nearly so depending as before on the extent of movement of the lever 26. It is to be observed that this operation is performed by one lever and takes place simultaneously with respect to the movement of the disks and the teeth.

There has thus been provided a simple and efficient device of the kind described and for the purpose specified.

It is obvious that many minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a harrow, a frame, hinged bars extending across said frame and having their ends slidably connected to the frame, a tooth bar rotatably mounted on said frame, earth working elements carried by said bars, and adjusting means for simultaneously moving the inner ends of said hinged bars in the direction of the length of the frame, and rotating the tooth bar.

2. In a harrow, a frame, including longitudinally disposed side members, a pair of guides swiveled on said side members, bars each slidably mounted in one of said guides, means to prevent the rotation of said bars in said guides, a link connecting the inner ends of said bars, bearings on said side members, a tooth bar journaled in said bearings, a rock arm on said tooth bar, a latch lever and quadrant, a link connecting said rock arm and latch lever, and a second link connecting the link between the ends of the first mentioned bars and said latch lever.

In testimony whereof, I affix my signature, in presence of two witnesses.

ALBERT LEO FLATTUM.

Witnesses:
OSCAR HARRISON,
N. E. BJERKE.